Figure 2:
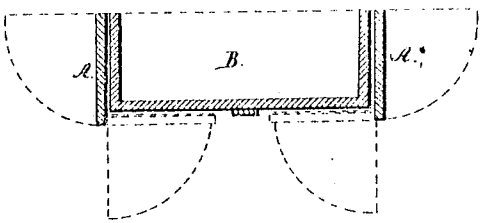
Figure 4:
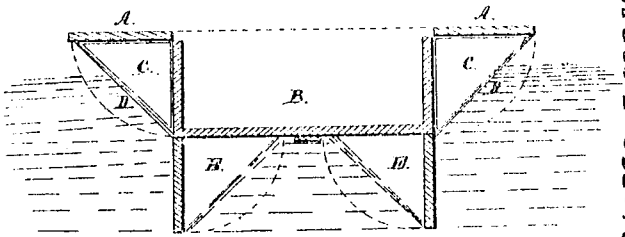
Figure 1:
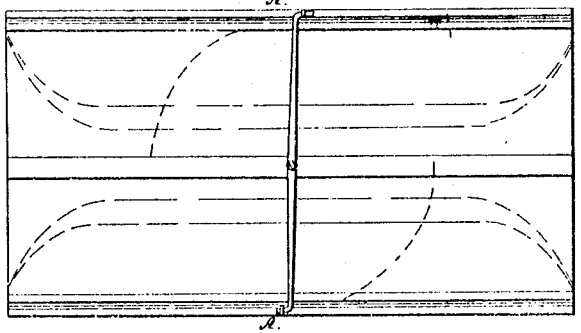
Figure 3:
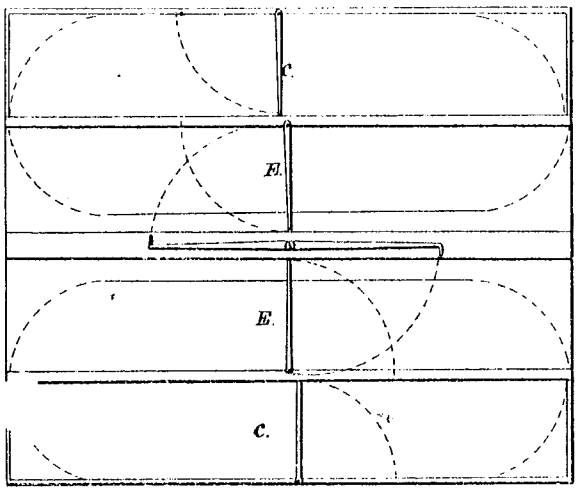

M3415

(2)

BEST AVAILABLE COPY

E. Foster.

Life Preserving Berth.

A. I. ~~No~~ 191. A I. Patented Feb. 16, 1858.

N. PETERS, PHOTO-LITHOGRAPHER, WASHINGTON, D. C.